Aug. 23, 1960 A. VIDA 2,949,689
METHOD OF MANUFACTURE OF GLASS AND/OR CERAMIC MOSAICS
Filed Dec. 18, 1958 2 Sheets-Sheet 1
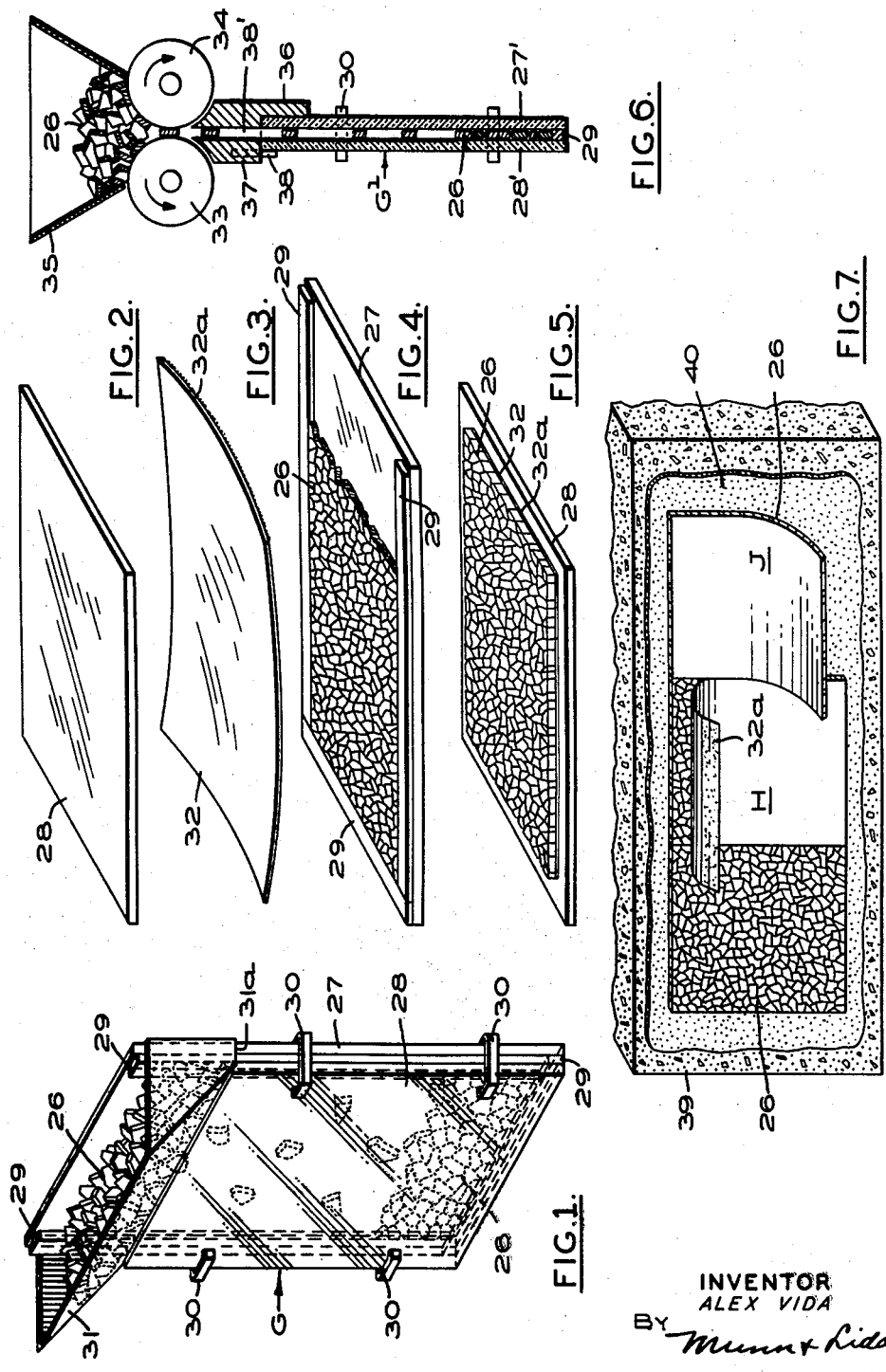
INVENTOR
ALEX VIDA
BY Munn & Liddy
ATTORNEYS

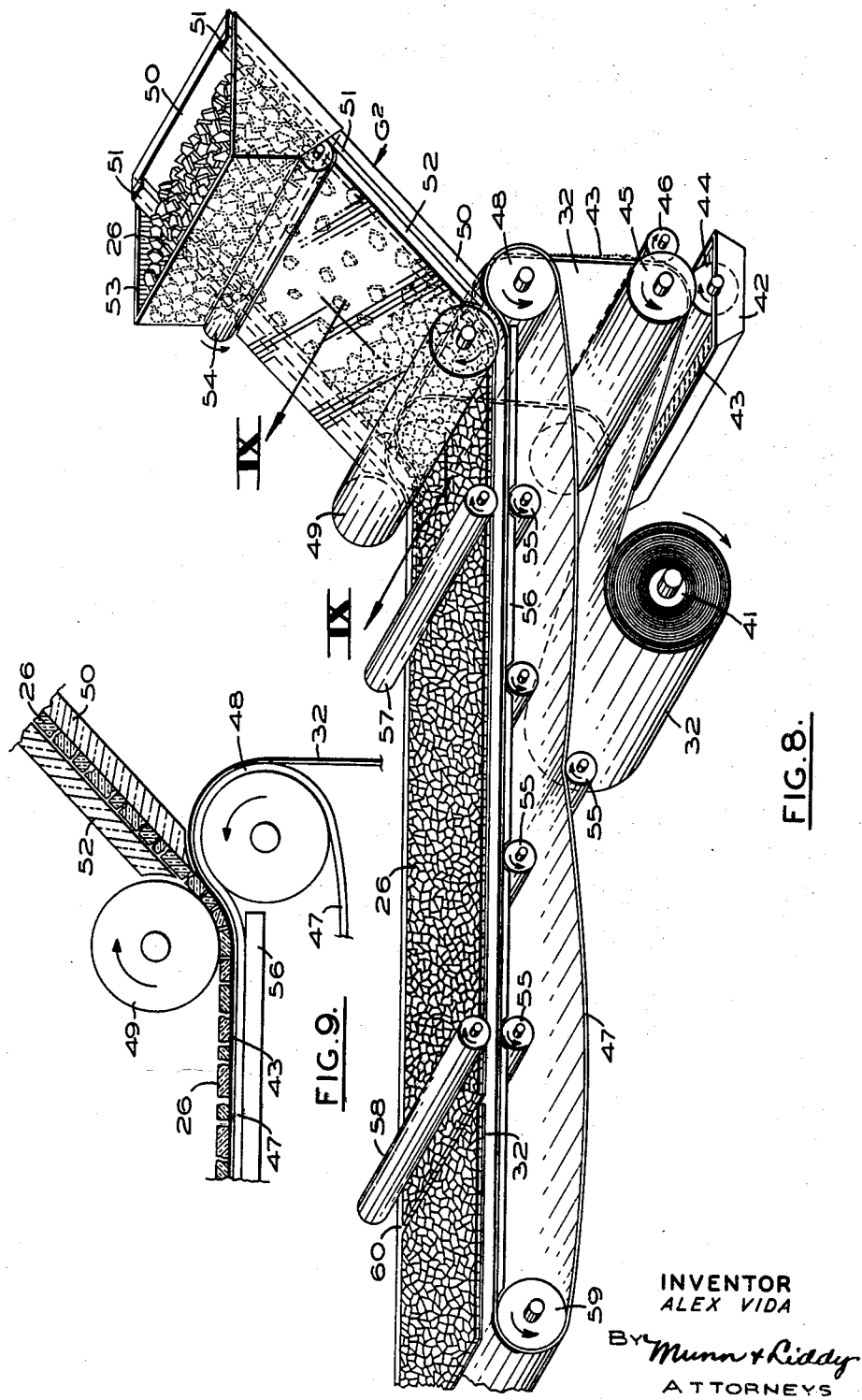

United States Patent Office 2,949,689
Patented Aug. 23, 1960

2,949,689

METHOD OF MANUFACTURE OF GLASS AND/OR CERAMIC MOSAICS

Alex Vida, 537 Kansas St., San Francisco 10, Calif.

Filed Dec. 18, 1958, Ser. No. 781,246

4 Claims. (Cl. 41—23)

The present invention is a continuation-in-part of my application on a method of manufacture and installation of glass and/or ceramic mosaics, Serial No. 501,636, filed April 15, 1955, now abandoned.

An object of my invention is to provide a method of forming mosaics of a predetermined size by feeding rigid chips having irregularly-shaped margins along a defined planar path and in a defined area and maintaining the chips in a single layer thickness closely grouped arrangement with the irregularly-shaped margins of the chips touching each other at some points and remaining spaced at other points to define grouting spaces between the chips. Additional chips are moved in a stream and in a single layer coplanar relationship with the first group of chips to cause the additional chips to move into contact with adjacent chips of the first group and with each other and thus be guided by mutual adjustment into a mosaic-forming relationship solely by virtue of being moved into contact with each other. The mosaic group of chips are then adhesively united by a backing member or by any other means to maintain the mosaic relationship.

I have disclosed two simple batch methods and one single continuous method for causing the chips to be arranged in a mosaic formation and then securing the chips together as a unit in this arrangement.

Other objects and advantages will appear as the specification proceeds and the novel features will be particularly set forth in the claims hereunto appended.

*Drawings*

For a better understanding of my invention, reference is made to the accompanying drawings forming a part of this application, in which Figures 1 to 7 inclusive illustrate a batch method of forming a mosaic and Figures 8 and 9 illustrate a continuous method.

Figure 1 is an isometric view of a chip-assembling unit of the hopper-feeding type wherein the chips are arranged in a plane;

Figure 2 is an isometric view of one of the plates utilized in the chip-assembling unit;

Figure 3 is an isometric view of an adhesive-coated sheet of paper or cloth to which the chips are bonded during the carrying-out of the steps of the batch method.

Figures 4 and 5 are isometric views of various parts of the chip-assembling unit, disclosing successive steps of the batch method;

Figure 6 is a vertical sectional view taken through a modified form of a batch chip-assembling unit of a roller-feeding type;

Figure 7 is a perspective view disclosing the method of transferring and installing the chips on a cementitious wall;

Figure 8 is an isometric view illustrating a continuous method wherein the chips are continuously assembled in a mosaic formation and while maintained in this form, they are secured to an adhesive-coated sheet of paper or cloth in a continuous method; and Figure 9 is a longitudinal sectional view taken along the plane IX—IX of Figure 8.

While I have shown only the preferred methods of my invention, it should be understood that various changes or modifications may be made within the scope of the annexed claims without departing from the spirit thereof.

*Detailed description*

Referring to Figure 1, a chip-assembling unit G of one of the simpler forms of the invention is shown. This unit comprises two rectangular flat plates 27 and 28 (thick plate glass will do and has certain advantages in that the operator can look through the glass and check on how the chips 26 are being assembled to form the mosaic). These plates are also shown in Figures 2, 4 and 5. The plate 27 is longer than the plate 28, and three spacer strips 29 are fastened along three of its edges (see Figure 4). The spacer strips 29 are slightly thicker than the chips 26, such as chips of window glass of uniform thickness that are to be fed between the plates and act as spacers between the plates 27 and 28 and form the boundary for the size of the mosaic on three of its sides. The plates 27 and 28 will be held apart in parallel relation by the spacer strips 29 and I use clamps 30 to bind the plates together as a unit. The space between the plates will be closed on three sides by the strips and the fourth side will be open. Figure 1 shows the plates 27 and 28 arranged in a vertical position although the plates can be inclined and will function just as well.

A trough 31 is fastened to the plates 27 and 28 at the open end or top of the device. The bottom edge 31a of the trough rests on the top edge of the shorter plate 28 and the spacer strips 29 keep this edge away from the longer plate 27. The trough 31 has its ends bent at right angles to the length of the trough and these ends have inwardly extending flanges to clip behind the longer plate 27. This makes the trough readily removable from the plates 27 and 28.

At the bottom of the trough 31 a slot is provided by the space between the plates 27 and 28, and is equal to the distance between the side spacer strips 29. The trough defines a hopper which can be filled with chips 26 to a suitable level. Some of the chips will fall through this slot, but most of them will jam at the bottom of the trough. A tool resembling a long tined fork (not shown) can be used and be moved back and forth along the slot until the remaining chips in the trough are made parallel with the slot and will drop therethrough and into the space between the two glass plates 27 and 28.

This process of filling the trough 31 with chips 26 and moving the tined fork along the slots to align the chips therewith, is repeated until the space between the plates 27 and 28 is filled to the desired level. It will be noted that the spacer strips 29 hold the plates 27 and 28 the correct distance to allow only a single layer of chips 26 to form. This method will produce a tight and uniform distribution of chips with the edges of adjacent chips touching each other at certain places. The general movement of the chips 26 is downward between the two glass plates, but as soon as the chips strike adjacent chips in their downward movement, they may be shifted laterally slightly to build up a mosaic form in the defined area formed by the plates 27 and 28 and the spacing border strips 29.

By making the plates out of glass, the filling of the space therebetween with chips 26, the operator can observe the process and make sure that the defined area is properly filled with chips and that there are no unnecessary voids in the mosaic form. There will be grout-receiving spaces between adjacent chips due to the irregular edges of the chips. After the chip-receiving form composed of the plates 27 and 28 and the spacing border strips 29 is filled with chips 26 to the desired level, the trough 31 is removed and the clamped plates are placed on a suitable support and in a horizontal position, care being taken that the plate 27 is on the bottom. The clamps 30 and the top plate 28 are then removed. The results are shown in Figure 4.

A backing sheet 32 of paper of cloth and coated with a suitable adhesive 32a, see Figure 3, is then applied to the mosaic body of chips 26 with the adhesive side being pressed against the chips. As will more fully be explained, the adhesive 32a is preferably water soluble to permit the backing sheet to be moistened and removed from the chips at a later time. The pressure on the sheet 32 may be applied by means of a brush or a soft roller (not shown), and this will press the adhesive against the chips. Any excess material of the sheet 32 may be trimmed off by running a razor blade along the inner edges of the border strips 29 and using a straight edge as a guide for trimming the top.

Next, the top plate 28, see Figure 2, is then replaced against the spacer strips 29 and the clamps 30 are again applied. The assembly is now turned over so that the plate 28 is now on the bottom. The clamps 30 are now disengaged and the plate 27 with its border strips 29 are removed. The results are shown in Figure 5. The chips 26 may be further flattened and pressed into the adhesive 32a by using a steel roller (not shown) after which the paper or cloth 32 with the mosaic chips 26 are removed and allowed to dry. After drying, the sheets can be further cut to size with shears or a hammer and a wide chisel applied to the paper side of the sheet.

In Figure 6, a modified chip-assembling unit G¹ is shown, wherein the glass plates 27' and 28' are of the same length and a roller-hopper device 33 to 38 is substituted for the trough 31 in Figure 1. As disclosed, a hopper 35 has rollers 33 and 34 mounted at the bottom thereof, with these rollers being rotated in opposite directions to each other. The purpose of the rollers is to eliminate the jamming of the chips that takes place when a trough 31 alone is used. After the plates 27' and 28' are assembled, in the manner previously described in connection with Figure 1, with the spacing strips 29 therebetween, they are placed in a vertical position under the fixed roller-hopper device 33 to 38. A rabbeted guide 36 receives the top edge of the plate 27' and a second guide 37 is spaced from the guide 36 and bears against the top edge of the plate 28'. Sliding pins 38 in the lower edge of the second guide 37 are used for contacting the outer face of the plate 28' and holding the chip-assembling unit G¹ so that its chip-receiving area will be aligned with the slot 38' provided between the guides 27' and 28'. The motor driven geared rollers 33 and 34 are rotated in the direction of the arrows in Figure 6, so that their adjacent surfaces will move upwardly and away from the slot 38'. After the rollers have been put in motion, the chips 26 are fed to the hopper 35. The opening between the rollers will allow chips to pass if they are positioned so that their faces will parallel the inner faces of the plates 27' and 28'. Any other chips which would normally jam are thrown upwardly and away from the opening 38' by the action of the revolving rollers and this will continue until the chips are turned into parallel arrangement with the slots 38' and will fall into the space between the paltes 27' and 28' while being maintained in this correct position.

The chips 26 in their downward movement will pass between the guides 36 and 37 and through the slot 38' which has the same width as the opening between the geared rollers 33 and 34. The width of the slot 38' is the same as the distance between the plates 27' and 28'. While the general movement of the chips 26 in the chip-assembly unit G¹ is downward, the chips will be moved laterally when coming into contact with adjacent chips and the result will be the forming of a mosaic of chips in the unit. When enough chips 26 have passed to fill the space between the plates 27' and 28', the rotation of the rollers 33 and 34 is stopped and the pins 38 slid back so that the clamped plates 27' and 28' can be removed. The plates are then placed in a horizontal position on a suitable support and the remaining steps of the process are repeated as set forth for the batch chip-assembling unit G, and illustrated in Figures 2 to 5 inclusive.

Figure 7 shows a method by which the chips 26 mounted on the paper 32 may be permanently fastened to a wall surface 39. On its exterior surface, the wall 39 should be concrete or Portland cement plastered. If the concrete walls are uneven, they can be straightened with a coat of cement plaster in accordance with the usual trade practices. After the wall 39 has been placed in condition to receive the paper-mounted chips, a bonding coat 40, preferably with a Portland cement base, is applied to the wall 39 in an even layer of about ⅛ inch or less in thickness. The bounding coat may be colored, if desired, and if the chips 26 are made of a clear glass, this color will show through the chips. The area that can be covered by the bonding coat 40 in a continuous application will depend on the rate of absorption of the wall and the drying conditions prevailing. Of course the bonding coat 40 must be in a plastic state when the sheets of paper-mounted chips are applied. The sheets are placed against this plastic coat 40 with the paper side 32 outermost. The chips 26 are embedded into the bonding coat by applying pressure with a trowel or a roller as needed to the paper backing.

After the sheets of paper-mounted chips are applied, and the bonding coat has set sufficiently, the paper is moistened, assuming that the adhesive is of the water soluble type. The moisture penetrates the paper to soften the adhesive 32a and this permits the paper to be removed, leaving the chips 26 exposed and embedded in the bonding coat 40. The exposed surfaces of the chips 26 are then washed and a colored grouting coat may be applied. The grouting will fill all the spaces between adjacent chips so that a smooth exterior surface of chips and grouting will be the result.

In Figure 7, the reference letters H and J designate two panels of paper mounted chips. Panel H shows the removal of the paper 32 from the chips 26 embedded in the bonding coat 40 after the paper has been moistened to loosen the adhesive 32a. Panel J shows the paper-mounted chips being applied to the bonding coat 40 before the chips are embedded in the bonding coat by troweling or by a roller. For interiors, other materials may be used for a bonding coat than Portland cement.

Referring now to Figures 8 and 9, these views show a method by which the chips 26 are mounted on paper 32 by a continuous process. The roll of paper 32 is mounted on and held in position by the roller 41. From this position, the paper 32 is fed between rollers 44 and 45 and between rollers 45 and 46. From here, the paper extends up to and over an endless canvas conveyor belt 47. Roller 44 is used to transfer adhesive 43 from a trough 42 to the paper 32. Roller 46 is adjusted to remove any excess adhesive and thus control the adhesive coating.

After the paper has been coated with the adhesive 43, it passes over the conveyor belt 47 and between rollers 48 and 49. At this point, the adhesive-coated paper contacts the glass chips 26 which descend from a modified chip-assembling unit G¹. Figure 9 shows an enlarged section of how this is accomplished. There are many points of similarity in the device that feeds the glass chips to the adhesive-coated paper in Figure 8, and those previously described in detail under Figures 1 and 6. In order to avoid detailed repetition, the main points of difference are noted. In Figure 8, plates 50 and 52 with the spacer strips 51 are fastened together permanently, and are positioned at a minimum angle that will permit the chips 26 to slide freely by gravity from a hopper 53 to the adhesive-coated paper 32. Here, only two spacer strips 51 are used, between plates 50 and 52, and the top and bottom of the space between these plates are left open.

In Figure 8, the unit G² is used as a chute to guide a single layer of chips from the hopper 53 to the adhesive 43 of the paper 32, and not as a container for these chips as described under Figures 1 and 6. A single roller 54 is shown in Figure 8 at the bottom of hopper 53. This arrangement operates in the same manner and serves the same purpose as the two rollers 33 and 34 at the bottom of hopper 35, as previously described in connection with Figure 6.

Certain modifications in the design of the hopper from that shown may be desirable for an even flow of glass chips 26 to the adhesive-coated paper. Obstructions and diversion devices (not shown), may be used as needed in both the hopper and the chute (50—52) to insure this even flow. When the glass chips have reached the bottom of the chute, they slide against and make contact with the adhesive 43 on the paper 32. The latter is supported and drawn forwardly by the conveyor belt 47. At this point, the undersurfaces of the chips are pressed against the adhesive by roller 49 which may be geared to roller 48, carrying the conveyor belt, or left to turn freely. The pressure applied by roller 49 can be adjusted through a screw-spring device (not shown). The elevation of roller 48 likewise may be adjusted so that the adhesive-coated paper and the conveyor belt can be accurately lined up with the slot at the bottom of plates 50 and 52 for maximum efficiency.

The conveyor belt 47 may be supported by additional rollers 55 and supports 56. This belt draws the chips 26 with the adhesive-coated paper under rollers 57 and 58 which apply additional pressure and help to present a flatter surface. Heat may be applied, as needed, along the conveyor to hasten the drying of the adhesive. As the paper-mounted chips approach a tail roller 59 and the end of the conveyor, they are cut to size along the line 60 and removed. The cutting device is not shown, but the paper-mounted chips can be readily and cleanly cut with manual or power-operated shears, a hammer and wide chisel, or trimmed with wide nippers, etc. In Figures 8 and 9, the rollers shown may be iron, rubber-covered, smooth or serrated, as required, to obtain the best results in the particular location. Some of them may be power-driven and others allowed to turn freely in order to secure the best tension and friction at different points in the system.

As in the two embodiments previously described, the plates 50 and 52 may be made of glass, thus affording an opportunity for the operator to observe the proper descending of the glass chips 26. In this way, voids of chips on the paper 32 may be prevented.

Although, I have referred to transparent glass chips, it will be apparent that various colored glass or ceramic chips may be employed. Even opaque materials, such as chips resulting from thin sheets of ceramic materials, clay, etc., may be used, and these chips may be obtained by other methods. The use of a colored bonding material that will show through clear or tinted glass may be utilized so that the chips will appear to be colored.

Although the invention has been described with a specific reference to water soluble adhesive, it is understood that other types of adhesives could be used so as to permit the removal of the backing sheet from the chips. Pressure sensitive adhesive that can be removed by peeling, thermo plastic adhesives that can be softened and removed by application of heat, or adhesives that can be loosened by special solvents, are typical examples of other types of adhesives that can be used.

In the manufacture of precast slabs, the paper mounted glass chips are placed on a suitable support with the chip side up and a bonding coat is then applied to the chips after which cementitious materials are added to form the proper thickness of the slab. When the slab has hardened sufficiently, it is turned over and the paper is removed, leaving the glass chips exposed.

I claim:

1. The method of forming mosaics by feeding chips of various sizes and shapes having irregular margins in a stream along a defined path having lateral boundaries, while permitting the chips to move laterally within the boundaries of the path so as to move adjacent chips into juxtaposed relation with one another and thereby close any spacious voids between the chips, regardless of the sizes and shapes of the chips; restraining said chips in a single layer thickness closely-grouped arrangement, with irregular margins of the adjacent chips touching each other at some points both longitudinally and laterally of the stream, and remaining spaced at other points both longitudinally and laterally of the stream to define irregular grouting spaces between said chips; moving in a stream in said path additional chips in a single layer coplanar relationship with said grouped arrangement to cause said additional chips to move into contact with adjacent chips in said grouped arrangement, with the additional chips being free to move laterally within the boundaries of the path when contacting adjacent chips, and thus be guided into stationary mosaic-forming relationship with the chips in said grouped arrangement solely by virtue of being moved into contact with the chips in said grouped arrangement; and uniting all of said chips into a unitary structure.

2. A method of assembling in a single layer a mosaic of irregularly-shaped chips comprising the steps of: providing a plurality of rigid chips of various sizes and shapes having irregularly-shaped edges; simultaneously moving the chips in a stream in a general direction and in a single layer; determining the ultimate area to be covered by the chips and continuing to feed the stream of chips into this area and in a single layer; the incoming chips moving into the area contacting adjacent chips in their movement and shifting laterally, if necessary, until each chip is stopped in its relative movement with other chips by being contacted by adjacent chips that in turn are prevented from further relative movement, whereby adjacent chips are moved into juxtaposed relation with one another and thereby close any spacious voids between the chips, regardless of the sizes and shapes of the chips, and the ultimate area is covered with a mosaic of chips in this manner; the irregular edges of adjacent chips providing grout-receiving spaces; and uniting the chips to maintain the mosaic-forming relationship as a unit.

3. In a method of manufacturing a mosaic structure, the steps of: providing a plurality of irregular mosaic chips of various sizes and shapes, each chip being flat faced and defining an irregular marginal edge; advancing these chips by gravity in a descending stream, while confining them to a single layer yet permitting them to move laterally, if necessary, when striking adjacent chips so as to move adjacent chips into juxtaposed relation with one another and thereby close any spacious voids between the chips, regardless of the sizes and shapes of the chips, until each chip is stopped in its relative movement by contacting other chips to provide a substantially uniform distribution of the chips over an area; all of the faces of the chips on each side of the stream being arranged in the same plane; the chips being advanced with adjacent chips touching each other at some points, and with varying spaces therebetween due to irregularities of the chips; and removably securing a backing sheet by adhesive to the chips to form a unitary structure; said spaces being open on one face of the chips to receive cementitious material; and said spaces being open on the other face of the chips when the backing sheet is removed to receive cementitious material.

4. In a method for the manufacture of a mosaic structure from a plurality of irregularly-shaped chips of various sizes and shapes, the steps of: simultaneously moving the chips in a stream in a general direction and in a single layer, while permitting the moving chips when striking each other to move laterally, if necessary, so as to move adjacent chips into juxtaposed relation with one another and thereby close any spacious voids between the chips, regardless of the sizes and shapes of the chips, and to fill a vacant area and thereby cause the chips to cover a predetermined area with a mosaic of chips.

References Cited in the file of this patent
UNITED STATES PATENTS

| | | |
|---|---|---|
| 832,207 | Pierce | Oct. 2, 1906 |
| 1,315,166 | Semashko | Sept. 2, 1919 |